W. COLE.
Brick-Machines.

No. 141,855.  Patented August 19, 1873.

WITNESSES.
Villette Anderson
Geo. Elpham

INVENTOR.
William Cole,
Chipman Hosmer & Co,
Attorneys

UNITED STATES PATENT OFFICE.

WILLIAM COLE, OF MILAN, TENNESSEE.

IMPROVEMENT IN BRICK-MACHINES.

Specification forming part of Letters Patent No. 141,855, dated August 19, 1873; application filed November 16, 1872.

*To all whom it may concern:*

Be it known that I, WILLIAM COLE, of Milan, in the county of Gibson and State of Tennessee, have invented a new and valuable Improvement in Brick-Machine; and I do hereby declare that the following is a full, clear, and exact description of the construction and operation of the same, reference being had to the annexed drawings making a part of this specification, and to the letters and figures of reference marked thereon.

Figure 1:
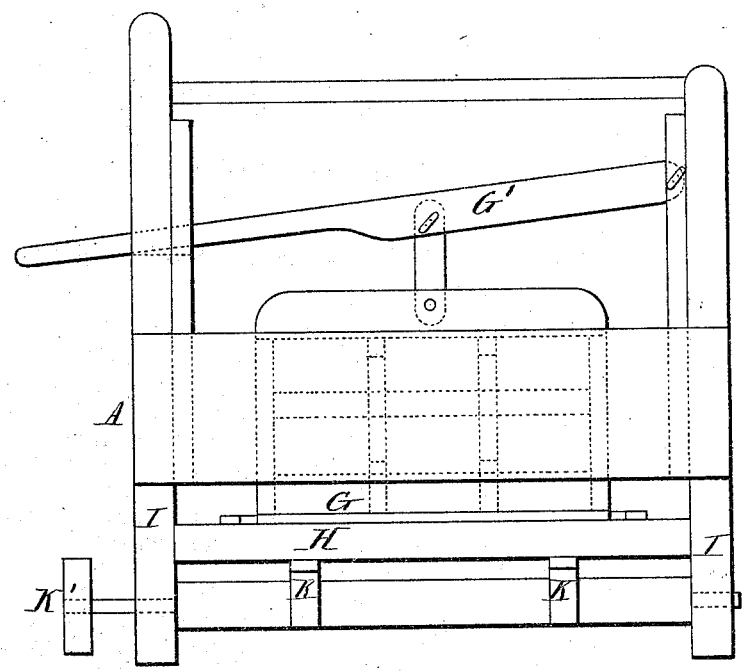
Figure 2:
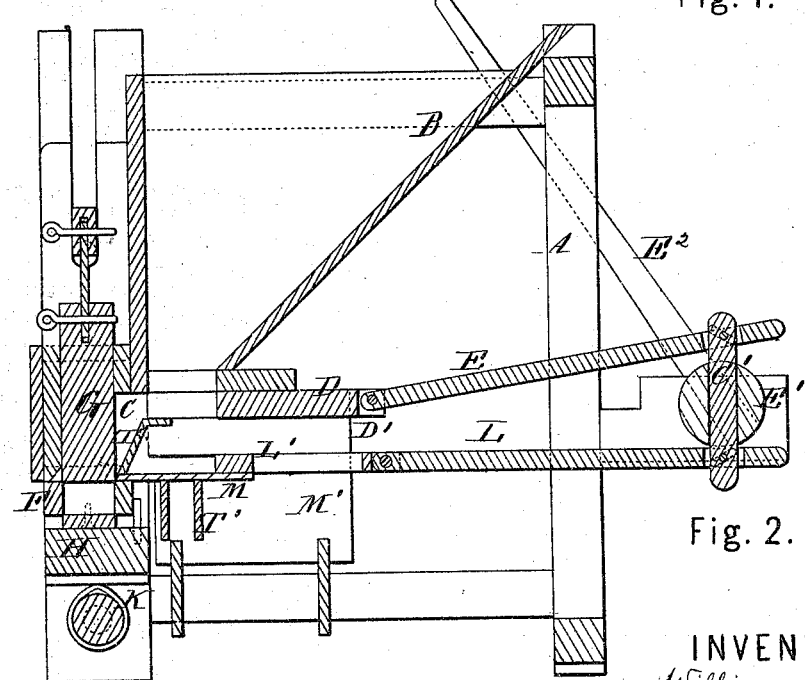

Figure 1 of the drawings is a representation of a front view of my invention. Fig. 2 is a sectional view of the same.

This invention has relation to brick-machines; and it consists in the construction and novel arrangement of the parts and devices, as hereinafter more fully described and claimed.

Referring to the drawings, A designates a substantial frame, supporting a hopper, B, below which is a clay box or receptacle, C, into which the clay falls through a suitable opening in the bottom of the hopper. The clay is forced through this opening, when required, by a reciprocating feeder, D, which travels between ways D', and is connected by a hinged rod, E, to the upper end of a projecting arm, C', of a rock-shaft, $E^1$, operated by a lever, $E^2$. The clay-receptacle contains the brick-molds F, into which the clay is pressed by a plunger, G, which is operated by means of a lever, G'. The molds are raised and lowered to throw them into proper position for filling, and being withdrawn by the platform H, upon which they rest, and which has its tenoned ends loosely fitted into long vertical mortises in the upright frame-pillars I. The vertical movement is imparted to said platform by eccentrics K on a transverse shaft operated by means of a pedal, K'.

To the lower end of the arm C' is connected, by means of a hinged rod, L, the cutter M, consisting of a thin plate or blade attached to a rectangular frame, L', traveling in parallel relation to the feeder and between ways M'. This cutter passes over the molds after they have been filled and the clay compressed, and shaves off the surplus clay.

The feeder and cutter move forward and backward alternately, and are so arranged that one does not interfere with the other's work. The feeder should hence have a longer sweep than the cutter. This may be effected by having the arm C' loosely fitted into its aperture in the rock-shaft, so that it may be adjusted up or down, and held at any position by means of a key, or by perforating the arm C' at different points near its end, so that the connecting-rod may be adjusted as close to the center of the rock-shaft as may be required.

The cutter is kept clean by means of the vertical blade T and the boards T'.

What I claim as new, and desire to secure by Letters Patent, is—

The combination and arrangement of the hopper B, plunger G, molds F, platform H, cams K, pedal K', feeder D, cutter M, pitmen E and L connected to the rock-shaft E', provided with the arm C', substantially as specified.

In testimony that I claim the above I have hereunto subscribed my name in the presence of two witnesses.

WILLIAM COLE.

Witnesses:
 J. H. JANES,
 WOODSON CLEMENTS.